United States Patent Office 3,215,948
Patented Nov. 2, 1965

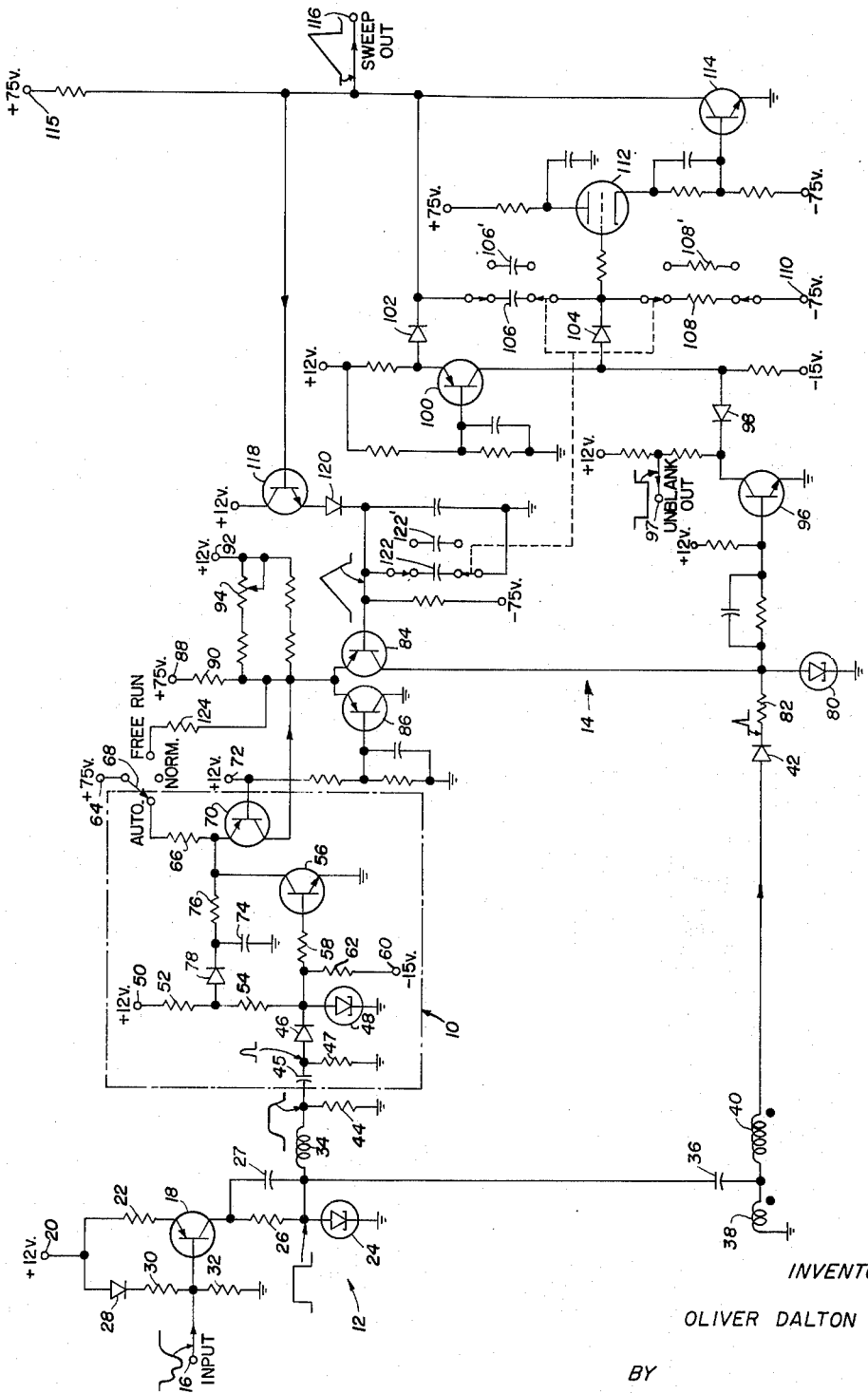

3,215,948
TRIGGERING CIRCUIT FOR AUTOMATICALLY CHANGING THE MODE OF OPERATION OF A SIGNAL GENERATOR
Oliver Dalton, Beaverton, Oreg., assignor to Tektronix, Inc., Beaverton, Oreg., a corporation of Oregon
Filed Mar. 23, 1962, Ser. No. 182,069
11 Claims. (Cl. 331—59)

The subject matter of the present invention relates generally to electrical circuits for controlling the operation of a signal generator circuit and specifically to a triggering circuit for controlling the operation of a ramp signal generator circuit so that such ramp generator circuit may free-run and also be triggered by an applied signal.

The triggering circuit of the present invention is particularly useful in cathode ray oscilloscopes to control the operation of a triggered type of horizontal sweep generator circuit when it is connected to operate in the so-called "automatic" mode. When operating in such automatic mode, the horizontal sweep generator of a cathode ray oscilloscope is used to present a horizontal reference line on the fluorescent screen of the cathode ray tube of such oscilloscope when vertical signals are not present, but the operation of such sweep generator is also triggered by the arrival of a vertical signal so that such vertical signal is displayed in the desired time relation with respect to such sweep. Conventional triggered sweep oscilloscopes usually have a trigger multivibrator ahead of the sweep generator circuit, which multivibrator produces trigger pulses in response to vertical signals applied to the vertical amplifier of the oscilloscope and supplies such trigger pulses to a sweep circuit gating multivibrator, for triggering such gating mutivibrator to cause operation of the sweep circuit. In such conventional oscilloscopes, the automatic mode referred to above has been provided by causing the trigger multivibrator to free-run when the trigger mode selector switch is in the automatic position. Since the trigger multivibrator is free-running, it triggers the sweep gating multivibrator of the horizontal sweep generator even when no vertical signal is supplied to the oscilloscope. The characteristics of the trigger multivibrator are, however, such that vertical signals of substantially higher frequencies than the free-running frequency of the trigger multivibration will still cause triggering of the sweep circuit. The automatic mode operation of the present invention has two main advantages over the conventional automatic mode of operation described. One of these advantages is operation with lower frequency vertical signals. In such conventional automatic mode operation, repetitive vertical signals of a frequency less than the free-running frequency of the trigger multivibrator cannot be displayed in synchronism with the sweep signal since successive vertical signal waveforms arrive after the sweep circuit has been automatically triggered by the free-running trigger multivibrator so that such vertical waveforms have no definite time relationship with the sweep.

In actual practice the free-running frequency of the trigger multivibrator in the automatic mode is usually about 50 cycles per second and the lowest frequency vertical signal which can be displayed is about 60 cycles per second.

The sweep circuit of the present invention will display repetitive vertical signals of much lower frequency when operating in its automatic mode than the conventional automatic mode operation described above. This is accomplished by utilizing a free-running sweep generator circuit instead of a free-running trigger multivibrator to provide the reference line in the absence of vertical signals. The free-running operation of the sweep generator circuit is temporarily stopped whenever vertical signals arrive, and the sweep generator circuit then operates in its normal triggered manner until vertical signals no longer are supplied. When such vertical signals no longer arrive, the sweep generator again becomes free-running and the reference line is again provided. Vertical signals having a frequency of the order of 10 cycles per second or lower can be displayed.

The second main advantage of the present automatic mode trigger circuit is that the reference line discussed above, provided by automatic mode operation, remains at high intensity or brightness even when high frequency vertical signals are being displayed. If the frequency of the vertical signals is high, for example, of the order of several megacycles per sec., the sweep generator circuit must be adjusted accordingly to provide a faster horizontal sweep speed. At the required fast sweep speeds, however, the horizontal reference line produced by the conventional free-running automatic mode operation of the trigger multivibrator has very low brightness on the fluorescent screen and ultimately is no longer visible. This is due to the fact that the frequency of the free-running trigger multivibrator remains low, i.e., of the order of 50 cycles per second as discussed above. For example, a sweep speed of 0.1 microsecond per centimeter will reproduce one cycle of a vertical signal having a frequency of 1 megacycle per second on a fluorescent screen having a graticule scale of 10 centimeters in length. Under these conditions, the electron beam of the cathode ray tube forming the horizontal reference line travels across the 10 centimeter trace area of the fluorescent screen in 1 microsecond once for each cycle of the free-running trigger multivibrator. Since 50 cycles per second requires 20,000 mincroseconds per cycle, the electron beam strikes the fluorescent screen for a very small percentage of the total time, i.e., less than .005 of 1%, so that the horizontal reference line is extremely dim or invisible.

The trigger circuit of the present invention also eliminates the problem of low brightness of the horizontal reference line at high sweep speeds. This results from the fact that the free-running frequency of the sweep generator circuit is very nearly proportional to the sweep speed of such sweep generator circuit so that this free-running frequency increases with sweep speeds. Thus, the electron beam strikes the fluorescent screen a much greater percentage of the time while providing the horizontal reference line during automatic mode operation.

It is, therefore, one object of the present invention to provide an improved electrical circuit for controlling the operation of a signal generator circuit.

Another object of the invention is to provide a triggering circuit for a horizontal sweep signal generator by which automatic mode operation, providing a horizontal reference line on the screen of a cathode ray tube, can be employed to display lower frequency vertical signals than conventional circuits capable of such automatic mode operation.

Another object of the present invention is to provide a triggering circuit for a horizontal sweep signal generator by which the horizontal reference line produced on the screen of a cathode ray tube during automatic mode operation remains bright when high sweep speeds are employed to display high frequency vertical signals.

A further object of the invention is to provide an automatic mode triggering circuit for a cathode ray oscilloscope by which the horizontal sweep circuit of such oscilloscope is caused to free-run to provide a horizontal reference line on the screen of a cathode ray tube and such free-running is discontinued upon the arrival of a vertical signal to be displayed or a triggering signal related to such vertical signal so that such signal can be employed to trigger the operation of such sweep circuit.

Other objects and advantages of the present invention will be apparent in the following detailed description of a preferred embodiment thereof shown in the attached drawings of which:

FIG. 1 is a schematic diagram of one embodiment of a triggering circuit of the present invention, connected to a sweep trigger multivibrator circuit and a horizontal sweep generator circuit.

The embodiment of the triggering circuit 10 of the present invention shown in FIG. 1 has its input connected to the sweep trigger multivibrator circuit 12 and its output connected to the horizontal sweep generator circuit 14 of a cathode ray oscilloscope. The input signal to the trigger multivibrator circuit 12 is supplied to the base of a PNP-type input transistor 18 through an input terminal 16. The transistor 18 is connected as a common emitter amplifier whose emitter is connected at 20 to a source of positive D.C. bias voltage through an emitter resistor 22. This input signal may be the vertical signal applied to the vertical deflection plates of the oscilloscope or it may be an external triggering signal which is related in time to such vertical signal. The collector of the transistor 18 is connected to the anode of a tunnel diode 24 through a load resistor 26 which is shunted by a bypass capacitor 27. A biasing circuit is connected to the base of the input amplifier transistor 18 including a coupling diode 28 having its anode connected to the voltage source 20 and its cathode connected to a dropping resistor 30 which forms a voltage divider with a bias resistor 32 having one end connected to ground. The negative input signals are amplified and inverted by the transistor 18 before they are applied as positive signals to the anode of the tunnel diode 24 which is connected as a bistable multivibrator quiescently biased to its low voltage stable state. Thus, the input signals produce a positive rectangular trigger signal on the anode of such tunnel diode by causing it to switch to its high voltage stable state and back to its low voltage state due to the positive going and negative going portions, respectively, of such input signals. The trigger signal so generated is transmitted through a coupling inductor 34 to the input of the trigger circuit 10. This trigger signal is also transmitted through a coupling capacitor 36 which is connected between a pair of series-connected coils 38 and 40 forming an auto transformer, and is delivered as a positive trigger pulse to the sweep generator circuit 14. One side of the coil 38 is grounded so that such coil constitutes the primary of the transformer. The signal is delivered to such primary by the coupling capacitor 36 and is differentiated to produce positive and negative pulse spikes corresponding to the leading and trailing edges of such trigger signal. These positive and negative pulse spikes are stepped up in voltage by the coil 40 and the positive spike is delivered as a positive trigger pulse to the generator sweep circuit 14 through a coupling diode 42. The output end of the coupling inductor 34 is connected to ground through a resistor 44 and to a differentiating network including a coupling capacitor 45 and a resistor 47, so that the trigger signal is integrated by the inductor 34 and transmitted as a stretched or widened trigger signal to the automatic mode triggering circuit 10 through such differentiating network where it is differentiated into positive and negative spike pulses that are coupled through a coupling diode 46 connected to transmit only positive signals.

The automatic mode triggering circuit 10 also includes a tunnel diode 48 connected as a bistable multivibrator with its anode connected to the cathode of the coupling diode 46 and its cathode grounded. The anode of the tunnel diode 48 is also connected to a source of positive D.C. bias voltage 50 through a pair of series-connected load resistors 52 and 54 to bias such tunnel diode normally in its low voltage stable state. The anode of the tunnel diode 48 is also connected to the base of an NPN-type switching transistor 56 through a coupling resistor 58. The emitter of the switching transistor 56 is connected to ground, while the base of such transistor is also connected to a source of negative D.C. bias voltage 60 through a bias resistor 62 so that such switching transistor is connected as a common emitter amplifier and is normally nonconducting. The collector of the switching transistor 56 is connected to a source of positive D.C. bias voltage 64 through a common load resistor 66 and a selector switch 68 when such switch is in the AUTO. position shown. The load resistor 66 is also connected in common with the emitter of a PNP-type gating transistor 70 so that such emitter is connected to the collector of the switching transistor 56. The base of the gating transistor 70 is connected to a source of positive D.C. bias voltage 72 while a collector of such transistor is connected as the output of the automatic mode trigger circuit 10 to the sweep generator circuit 14 so that the gating transistor is connected as a common base amplifier. This gating transistor is normally conducting in order to transmit current from the source 64 through the emitter-collector circuit of such gating transistor to such sweep generator circuit. The common connection of the load resistor 66 and the collector of the switching transistor 56 is connected to one plate of a delay time capacitor 74 through a coupling resistor 76. This plate of the capacitor is also connected to the cathode of a gating diode 78 whose anode is connected between the load resistors 52 and 54. The charge on the delay time capacitor 74 is normally only about +12.5 volts due to the 0.5 volt forward bias across the emitter junction of the gating transistor 70 and this is sufficient to reverse bias the gating diode 78 so that it is normally nonconducting.

The sweep generator circuit 14 is similar to that shown in FIG. 6 of the U.S. Patent No. 2,853,609 entitled "Multivibrator Hold Off Circuit," which issued on September 23, 1958, and will not be described in detail for this reason. Briefly, the sweep generator circuit 14 includes a tunnel diode 80 connected as a bistable multivibrator so that it functions as the sweep gating multivibrator. This tunnel diode has its cathode grounded with its anode connected to the cathode of the coupling diode 42 through a coupling resistor 82 and to the collector of a PNP-type amplifier transistor 84 whose emitter is connected to the collector of the gating transistor 70. A PNP-type clamping transistor 86 is connected at its emitter to the emitter of transistor 84, at its base to the voltage source 72 and at its collector-to-ground so that such clamping transistor prevents the voltage on the emitter of the transistor 84 from rising with the positive hold-off signal, applied to its base in a manner hereafter described. The emitter of the amplifier transistor 84 is connected to a source of positive D.C. bias voltage 88 through a common load resistor 90 which supplies bias current for the tunnel diode 80 through the collector of such transistor, and is connected to a smaller source of positive D.C. bias voltage 92 through a series-parallel resistance network including a variable resistance potentiometer 94 which controls the trigger threshold of the tunnel diode 80 by varying the bias current supplied thereto.

In the normal position ("NORM.") of the selector switch 68, the transistor 84 and 86 are biased so that, in the quiescent operating condition of the sweep generator 14, the current flowing through the tunnel diode 80 is less than its peak current and is therefore insufficient to switch such tunnel diode to its high voltage stable state. However, there is sufficient bias so that any trigger pulse transmitted through the coupling diode 42 will switch the tunnel diode to this high voltage state to produce a positive going gating signal which is transmitted to the base of an NPN-type gating transistor 96 to provide a negative going gating signal on the collector of such transistor. The negative gating signal so produced may be connected to the control grid of the cathode ray tube at an output terminal 97 to serve as an unblanking signal after it is inverted.

This negative gating signal is also transmitted through a coupling diode 98 and through the collector-to-emitter circuit of a PNP-type feedback transistor 100 to the anodes of a pair of disconnect diodes 102 and 104, which are connected to a timing capacitor 106. This removes the normal forward bias on such disconnect diodes and allows the timing capacitor 106 connected between the cathodes of such disconnect diodes to charge due to current flowing through a timing resistor 108 from a source of negative D.C. bias voltage 110 connected to one end of such timing resistor. The common connection of the timing capacitor and the timing resistor is connected to the grid of a triode vacuum tube 112 which may be a Nuvistor connected as a cathode follower amplifier. The emitter of this cathode follower tube is connected to the base of an NPN-type amplifier transistor 114 having its emitter grounded and its collector connected to a source of positive D.C. bias voltage 115 and to the other side of the timing capacitor 106 so that such transistor functions as a Miller run-up amplifier having a high gain. The operation of the circuit including elements 100 to 115 is similar to a conventional Miller run-up circuit which produces a positive ramp voltage of substantially constant rate on the collector of the transistor 114 at an output terminal 116 since the voltage on the grid of tube 112 remains substantially constant due to the negative A.C. feedback through capacitor 106. One difference is the addition of the transistor 100 in the D.C. feedback circuit from the collector of the Miller transistor 114 to prevent any variation of the grid bias voltage of the cathode follower tube 112 due to changing the timing resistor 108 to thus maintain the sweep starting voltage constant. Also the cathode follower tube 112 is employed as a current driver stage for the Miller amplifier transistor 114 because its low grid current prevents the diverting of charging current from the timing capacitor 106. This is necessary because the sweep ramp only goes from +2 to +10 volts so that a variation of only one volt grid bias would introduce an error of 15% in the output signal for this transistorized sweep generator circuit. The horizontal sweep signal is fed back through a hold-off circuit including an NPN-type emitter-follower transistor 118. The positive sweep signal is transmitted from the emitter of the emitter-follower transistor 118 through a coupling diode 120 to a hold-off capacitor 122 connected from the cathode of such coupling diode to ground. Since this emitter-follower transistor has a capacitive load it will follow going up positively better than coming down negatively, and will change the sweep ramp into the form of a stretched or widened saw-tooth signal having maximum and minimum voltages corresponding to those of the sweep signal, but with a wider negative going portion of its waveform. This positive hold-off signal is applied to the base of transistor 84 which decreases the current flowing through the tunnel diode 80 and switches such tunnel diode back to its low voltage state. The negative going gating signal produced by the return of the tunnel diode multivibrator to its low voltage state is inverted by the transistor 96 so that it is applied as a positive going signal to the anodes of disconnect diode to "open" such diodes by removing the reverse bias thereon and to allow timing capacitor 106 to discharge to its quiescent voltage. The stretched negative going portion of the hold-off signal prevents the tunnel diode 80 from being triggered by trigger pulses after it has returned to its low voltage state, until the charge on the capacitors of the sweep generator including the timing capacitor have reached their quiescent voltages. Therefore, when the selector switch 68 is in its "NORM." position the voltage source 64 is disconnected and the sweep generator circuit 14 functions as a normal sweep generator circuit which must be triggered by triggering pulses transmitted through the coupling diode 42 to the sweep gating mutlivibrator 80 before the Miller run-up circuit including the transistor 114 will produce a horizontal sweep signal at the output terminal 116. In this position of the selector switch 68 no current flows from the emitter to the collector of the gating transistor 70 so that the total curent flowing in the collector of the transistor 84 is below the peak current of the tunnel diode 80 and is not sufficient to cause such tunnel diode to switch to its high voltage stable state. Since a trigger pulse is required to switch the tunnel diode 80 from its low to its high voltage stable state, the sweep generator circuit 14 now has a triggered operation. It should be noted that timing capacitor 106, timing resistor 108 and hold-off capacitor 122 can all be changed to provide different sweep speeds and that the switches connecting them into the circuit are ganged together.

When the selector switch 68 is in the "Free-Run" position the voltage source 64 is connected to the emitter of the transistor 84 through a load resistor 124 which is now connected in parallel with the load resistor 90 to reduce the total effective load resistance of such transistor. When this happens, the current flowing in the collector of the transistor 84 increases so that it is above the peak current for the tunnel diode 80 and enables such tunnel diode to switch to its high voltage stable state without receiving a triggering pulse through the coupling diode 42. As a result, the Miller run-up circuit including the transistor 114 produces a horizontal sweep output signal at the output terminal 116. The positive hold-off signal produced by this sweep signal, on the base of the transistor 84 appears as a negative signal on the anode of the tunnel diode 80 and switches such tunnel diode back to its original low voltage state. Then the tunnel diode 80 is again switched to its high voltage stable state by current flow from sources 64, 88 and 92 through the emitter and the collector of the transistor 84 when the trailing edge of the hold-off signal has allowed the anode of such tunnel diode to rise sufficiently positive. Thus, a free-running mode of operation of the sweep generator circuit 14 is produced since trigger pulses are not required to switch the tunnel diode multivibrator 80. This ordinary free-running operation cannot be stopped except by moving the selector switch 68 to a different position.

The third mode of operation, corresponding to the "AUTO" position of the selector switch 68 shown in FIG. 1, combines features of both of the previous described modes in that the sweep generator 14 operates both as a free-running and as a triggered sweep generator in the automatic mode due to the triggering circuit 10 of the present invention. Before any triggering signals are received, the gating transistor 70 is normally conducting when the selector switch 68 is in the "AUTO" position so that the total amount of current flowing in the collector circuit of the transistor 84 is sufficient to switch the tunnel diode 80 to its high voltage state. Therefore, the sweep generator circuit 14 is in a free-running operating condition and produces horizontal sweep signals at the output terminal 116 without receiving triggering pulses through the coupling diode 42.

When a negative input signal is received at the input terminal 16, the tunnel diode 24 switches from its low to its high voltage stable state to produce a positive triggering signal which is differentiated and transmitted as a positive pulse through the coupling diode 46 to the anode of the tunnel diode 48. This triggering signal switches the tunnel diode 48 to its high voltage stable state and causes a positive going signal to be applied to the base of the transistor 56, rendering such transistor conducting from its normally nonconducting condition. This positive going signal is amplified and inverted by the switching transistor 56 so that it is applied as a negative going signal to the emitter of the gating transistor 70 and renders such gating transistor nonconducting. The result of making the gating transistor 70 nonconducting is to lower the amount of current flowing in the collector of the transistor 84 below the peak current of the tunnel diode 80 so that the sweep generator circuit 14 has been placed in a triggered operating condition and is no longer free-running. Thus, the sweep generator circuit now requires a trigger pulse to produce a horizontal sweep signal. This trigger pulse is supplied by the differentiating circuit including the auto transformer coils 38 and 40 which differentiates the triggering signal to produce positive and negative spikes across the coil 40. The positive spikes are transmitted through the coupling diode 42 as triggering pulses to the anode of the tunnel diode 80 and cause such tunnel diode to switch to its high voltage stable state, so that the Miller run-up circuit including the transistor 114 produces a sweep signal at the output terminal 116.

This triggered operation continues as long as input signals are applied to the input terminal 16 with sufficient rapidity so that time between input signals is less than the recovery time of the triggering circuit 10. The time delay capacitor 74 is normally charged to about +12.5 volts to provide a .5 volt forward bias on the emitter junction of the gating transistor 70 and to reverse the bias gating diode 78. However, when the switching transistor 56 becomes conducting, this capacitor discharges to ground through the emitter-to-collector circuit of such switching transistor until the coupling diode 78 becomes forward biased to transmit current from the source 50. This causes a negative current pulse to be applied to the anode of the tunnel diode 48 causing such tunnel diode to switch back to its low voltage stable state. A negative going voltage is developed upon the anode of the tunnel diode 48 due to this switching action which is transmitted to the base of the switching transistor 56 to cause such transistor to become nonconducting again. As a result of this, the time delay capacitor 74 stops discharging through the transistor 56 and begins charging toward the +75 volts of source 64 through the load resistor 66 until it again returns to about +12.5 volts so that the emitter junction of the gating transistor 70 is forward biased to allow current to flow through such gating transistor to the emitter of the transistor 84 from the source 64. Thus, the total current flowing in the collector of the transistor 84 is again sufficient to switch the tunnel diode 80 and to allow free-running operation of the sweep generator circuit 14.

However, if another trigger signal is received at the anode of the tunnel diode 48 before the time delay capacitor 74 has charged up to the voltage required to open the gating transistor 70, the tunnel diode will switch to its high voltage stable state and produce a positive going signal which renders the switching transistor 56 again conducting so that the display time capacitor again begins discharging to ground through such gating transistor and cannot reach a sufficient positive voltage to render the gating transistor 70 conducting. Thus, the charging rate of the capacitor 74 through the resistors 76 and 66 determines the recovery time of the triggering circuit 10 and the low frequency limit of such automatic mode operation. As has been previously discussed, this recovery time can be fixed at any convenient value and is usually a compromise between that which gives a low limit frequency and that which allows sufficiently fast recovery for convenient obtaining of a horizontal reference line. If the total charging time of the capacitor 74 is 0.1 second, this means that the triggering signals must occur more often than 0.1 second or have a frequency greater than 10 c.p.s. if the sweep generator circuit 14 is to be held in its triggered operating condition and not allowed to return to its free-running condition. Therefore, if the triggering signals are farther apart than 0.1 second or are of a lower frequency than 10 c.p.s., the triggering circuit 10 will have a chance to recover so that it again produces a free-running operation of the sweep generator circuit 14 and prevents such sweep circuit from being triggered by a trigger pulse from a subsequent input signal.

It will be obvious to those having ordinary skill in the art that various changes may be made in the details of the above-described preferred embodiment of the present invention. Therefore, it is not intended to limit the scope of the present invention to the above detailed description but that scope should only be determined by the following claims.

I claim:
1. An electrical circuit for controlling the operation of a signal generator circuit, comprising:
   means for causing said signal generator to operate normally as a free-running signal generator to produce output signals;
   means including an electronic switch for automatically stopping the free-running operation of said signal generator by changing the conductive state of said switch in response to trigger signals and for enabling said signal generator to operate as a triggered signal generator so that it does not produce output signals until triggered; and
   means for triggering said signal generator by trigger pulses which are derived from said trigger signals so that said signal generator again produces output signals and each of the output signals is produced in response to a different trigger pulse.

2. An electrical circuit for controlling the operation of a signal generator circuit, comprising:
   means for causing said signal generator to operate normally as a free-running signal generator to produce output signals;
   means including an electronic switch for automatically stopping the free-running operation of said signal generator by changing the conductive state of said switch in response to trigger signals and for enabling said signal generator to operate as a triggered signal generator so that it does not produce output signals until triggered;
   means for triggering said signal generator by trigger pulses which are derived from said trigger signals so that said signal generator again produces output signals and each of the output signals is produced in response to a different trigger pulse; and
   means for automatically returning said signal generator to its free-running operation from its triggered operation after a time delay by returning said switch to its normal conductive state if no trigger signals are received by said means for stopping free-running operation during said time delay.

3. A trigger circuit for controlling the operation of a ramp signal generator circuit, comprising:
   means for causing said signal generator to operate as a free-running signal generator to produce ramp voltage output signals;
   means including an electronic switch for automatically stopping the free-running operation of said signal generator by changing the conductive state of said switch in response to sweep trigger signals and for enabling said signal generator to operate as a triggered signal generator so that it does not produce output signals until triggered;
   means for triggering said signal generator by trigger pulses which are derived from said trigger signals so that said signal generator again produces output signals and each of the output signals is produced in response to a different trigger pulse; and
   means for automatically returning said signal generator to its free-running operation from its triggered operation after a time delay by returning said switch to its normal conductive state if no trigger signals are received by said means for stopping free-running operation for a predetermined time.

4. A trigger circuit for use in a cathode ray oscilloscope to control the operation of the horizontal sweep generator circuit of said oscilloscope, comprising:
   a sweep generator which produces ramp voltage output signals;
   means including an electronic device for increasing the current flowing in a portion of said sweep generator circuit and to cause said sweep generator to free-run so that it produces output signals without receiving trigger signals;

means for automatically reducing the current flowing in said circuit portion by changing the conductive condition of said device in response to trigger signals, in order to stop the free-running operation of said sweep generator and to enable triggered operation of said sweep generator so that it does not produce output signals until triggered;

means for triggering said sweep generator by trigger pulses which are derived from said trigger signals so that said sweep generator produces output signals in response to said trigger pulses; and means for automatically returning said sweep generator to its free-running operation and stopping its triggered operation by returning the device to its initial conductive condition if no trigger signals are received for a predetermined time by said means for reducing the current.

5. A trigger circuit for use in a cathode ray oscilloscope to control the operation of the horizontal sweep generator circuit of said oscilloscope, comprising:

means including an electronic switch for increasing the current flowing in a portion of said sweep generator circuit in one conductive state of said switch to cause said sweep generator to free-run so that it produces ramp voltage output signals without receiving trigger signals;

means for changing the switch to another conductive state in response to trigger signals to reduce the current flowing in said circuit portion, in order to stop the free-running operation of said sweep generator and to enable triggered operation of said sweep generator so that it does not produce output signals until triggered;

means for triggering said sweep generator by trigger pulses which are derived from said trigger signals so that said sweep generator produces output signals in response to said trigger pulses; and means for automatically returning the switch to its first conductive state to cause said sweep generator to return to its free-running operation and stopping its triggered operation if no trigger signals are received for a predetermined time by said switch.

6. A trigger circuit for use in a cathode ray oscilloscope to control the operation of the horizontal sweep generator circuit of said oscilloscope, comprising:

means including a gating electron device for reducing the impedance of a portion of said sweep generator circuit to increase the bias current flowing to a sweep gating multivibrator in said sweep generator and to cause said sweep generator to free-run so that it produces output signals without receiving trigger signals;

means including a switching electron device for automatically increasing the impedance of said circuit portion back to its normal high impedance in response to trigger signals to reduce the current flowing to said multivibrator, in order to stop the free-running operation of said sweep generator and to enable triggered operation of said sweep generator until triggered;

means for triggering said sweep generator by applying trigger pulses to said multivibrator which are derived from said trigger signals so that said sweep generator produces output signals in response to said trigger pulses; and means for automatically returning said sweep generator to its free-running operation and stopping its triggered operation if no trigger signals are received for a predetermined time by said means for increasing the impedance of said circuit portion.

7. A triggering circuit for use in a cathode ray oscilloscope to control the operation of the horizontal sweep generator circuit of said oscilloscope, comprising:

a bistable multivibrator;

a switching transistor connected to the output of said multivibrator;

a common load impedance connected at one end to said switching transistor;

a first source of electrical current connected to the other end of said impedance;

a gating transistor connected at its input to said switching transistor and to said first source of current through said impedance and having its output adapted to be connected to said sweep generator, said gating transistor being biased normally conducting so that current flows from said first current source through said gating transistor to said sweep generator circuit;

a time delay capacitor connected in common to said switching transistor, said gating transistor, and to said one end of said impedance;

a gating diode connected at one end to said capacitor so that said gating diode is biased normally nonconducting;

a second source of electrical current connected to the other end of said gating diode and to said multivibrator; and means to apply trigger signals to said multivibrator.

8. An automatic mode triggering circuit for use in a cathode ray oscilloscope to control the operation of the horizontal sweep generator circuit of said oscilloscope, comprising:

a tunnel diode connected as a bistable multivibrator and biased normally to its low voltage stable state;

a switching transistor connected at its base to the anode of said tunnel diode and biased normally nonconducting;

a common load resistor connected at one end to the collector of said switching transistor;

a first source of electrical current connected to the other end of said resistor;

a gating transistor connected at its emitter to the collector of said swiching transistor and to said first source of current through said resistor and having its collector adapted to be connected to said sweep generator, said gating transistor being biased normally conducting so that current flows from said first current source through said gating transistor to said sweep generator circuit;

a time delay capacitor connected at one plate in common to the collector of said switching transistor, the emitter of said gating transistor and to said one end of said resistor;

a gating diode connected at its cathode to said one plate of said capacitor and biased normally nonconducting;

a second source of electrical current connected to the anode of said gating diode and to the anode of said tunnel diode; and means to apply positive trigger signals to the anode of said tunnel diode.

9. An automatic mode triggering circuit for use in a cathode ray oscilloscope to control the operation of the horizontal sweep generator circuit of said oscilloscope, comprising:

a tunnel diode connected as a bistable multivibrator and biased normally to its low voltage stable state;

an NPN type switching transistor connected at its base to the anode of said tunnel diode and biased normally nonconducting;

a common load resistor connected at one end to the collector of said switching transistor;

a first source of electrical current connected to the other end of said resistor;

a PNP-type gating transistor connected at its emitter to the collector of said switching transistor and to said first source of current through said resistor and having its collector adapted to be connected to said sweep generator, said gating transistor being biased normally conducting so that current flows from said first current source through said gating transistor to said sweep generator circuit and produces a free-running operation of said sweep generator circuit;

a time delay capacitor connected at one plate in common to the collector of said switching transistor, the emitter of said gating transistor and to said one end of said resistor;

a gating diode connected at its cathode to said one plate of said capacitor and biased normally nonducting;

a second source of electrical current connected to the anode of said gating diode and to the anode of said tunnel diode;

a coupling diode connected at its cathode to the anode of said tunnel diode; and means to apply positive trigger signals to the anode of said coupling diode in order to switch said tunnel diode to its high voltage stable state, to render said switching transistor conducting and to render said gating transistor nonconducting so that the free-running operation of said sweep generator ceases and a triggered operation of said sweep generator is initiated thereby, said triggered operation ceasing and said free-running operation returning if no trigger signals are applied to said tunnel diode for a predetermined time which is fixed by the discharge rate of said capacitor.

10. A signal generator circuit, comprising:

an oscillator signal generator;

means for causing said oscillator to normally operate as a free-running signal generator to produce output signals;

means including an electronic switch for automatically stopping the free-running operation of said oscillator by changing the conductive state of said switch in response to trigger signals and for causing said oscillator to operate as a triggered signal generator; and means for applying trigger pulses to said oscillator corresponding to said trigger signals to cause it to produce output signals with each of such output signals being produced in response to a different trigger pulse.

11. A ramp signal generator circuit, comprising:

a ramp signal oscillator capable of producing ramp voltage output signals;

means for causing said oscillator to normally operate as a free-running signal generator to produce output signals without being triggered;

means including an electronic device for stopping the free-running operation of said oscillator by changing the conductive state of said device in response to a first trigger signal and for causing said oscillator to operate as a triggered signal generator which produces an output signal only after receiving a trigger pulse; and means for automatically returning the operation of said oscillator to free-running after a time delay by returning said device to its normal conductive condition if no additional trigger signals are received by said means for changing the operation within a predetermined time after said first trigger signal.

References Cited by the Examiner
UNITED STATES PATENTS

| | | | |
|---|---|---|---|
| 2,541,230 | 2/51 | Fleming-Williams | 331—59 |
| 2,676,251 | 4/54 | Scarbrough | 331—149 X |
| 2,896,081 | 7/59 | Machlis | 328—196 X |
| 3,037,114 | 5/62 | Bier et al. | 328—196 X |

ARTHUR GAUSS, *Primary Examiner.*

GEORGE N. WESTBY, *Examiner.*